(12) United States Patent
Kim

(10) Patent No.: US 9,165,295 B2
(45) Date of Patent: *Oct. 20, 2015

(54) AUTOMATED CARD INFORMATION EXCHANGE PURSUANT TO A COMMERCIAL TRANSACTION

(76) Inventor: Moon J. Kim, Wappingers Falls, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 13/103,682

(22) Filed: May 9, 2011

(65) Prior Publication Data

US 2012/0286930 A1 Nov. 15, 2012

(51) Int. Cl.
*G05B 19/00* (2006.01)
*G06Q 20/32* (2012.01)
*G06K 19/07* (2006.01)
*G06Q 20/40* (2012.01)
*G07F 7/08* (2006.01)

(52) U.S. Cl.
CPC ........ *G06Q 20/3278* (2013.01); *G06K 19/0728* (2013.01); *G06Q 20/40145* (2013.01); *G07F 7/0893* (2013.01)

(58) Field of Classification Search
CPC .......... G06Q 20/341; G06Q 20/40145; G06Q 20/40; G06Q 20/4097; G07F 7/1008; G06K 19/0728; G06K 19/07703; G06F 2221/2103
USPC ......... 235/454, 375–385; 340/10.1–10.4, 5.6, 340/5.81–5.82, 5.4–5.42, 572.1–572.8; 713/168
See application file for complete search history.

(56) References Cited

U.S. PATENT DOCUMENTS 4,758,718 A 7/1988 Fujisaki et al.
4,916,296 A 4/1990 Streck
4,954,985 A 9/1990 Yamazaki
(Continued)

OTHER PUBLICATIONS

Kerala,T., "Biometric Card Key", Biometric Class Reader, Indiamart, 20 pages. http://www.indiamart.com/company/2767972/products.html.
(Continued)

*Primary Examiner* — Ojiako Nwugo
(74) *Attorney, Agent, or Firm* — Madeline F. Schiesser; Keohane & D'Alessandro PLLC

(57) ABSTRACT

In general, embodiments of the present invention relate to a card and associated methods for automated information (static and dynamic) exchange pursuant to a commercial transaction. In a typical embodiment, the card (e.g., a credit card, a debit card and/or a smart card) comprises an energy component for providing power to the card and a back display (e.g., positioned on the back or magnetic strip side of the card) for displaying card information being used in the commercial transaction. Upon display, a terminal (e.g., a point of sale terminal) will scan/read the card information and generate a corresponding source validation code (SVC). An imager positioned on the back of the card will scan/read the SVC and card validation code (CVC) logic on the card will generate a CVC based on the SVC (e.g., based on a validation result of the SVC). A biometric reader positioned on a front side of the card will take a biometric reading from a user of the card and corresponding user validation code (UVC) logic will generate a UVC based on the biometric reading. The underlying commercial transaction can then be validated (e.g., by a server associated with the terminal or by validation logic on the card itself), a validation result can be displayed on a front display (e.g., positioned on the front side of the card).

20 Claims, 9 Drawing Sheets

(56) References Cited

U.S. PATENT DOCUMENTS

| | | | |
|---|---|---|---|
| 5,789,733 A * | 8/1998 | Jachimowicz et al. | 235/492 |
| 5,880,769 A * | 3/1999 | Nemirofsky et al. | 725/139 |
| 6,012,034 A | 1/2000 | Hamparian et al. | |
| 6,050,494 A | 4/2000 | Song et al. | |
| 6,188,309 B1 | 2/2001 | Levine | |
| 6,325,285 B1 * | 12/2001 | Baratelli | 235/380 |
| 6,641,050 B2 | 11/2003 | Kelley et al. | |
| 6,662,166 B2 | 12/2003 | Pare, Jr. et al. | |
| 6,687,339 B2 | 2/2004 | Martin | |
| 6,739,505 B2 | 5/2004 | Walker et al. | |
| 6,840,455 B2 * | 1/2005 | Norton | 235/492 |
| 6,997,381 B2 | 2/2006 | Amouse | |
| 7,025,277 B2 * | 4/2006 | Forrest et al. | 235/492 |
| 7,172,115 B2 | 2/2007 | Lauden | |
| 7,205,473 B2 | 4/2007 | Li et al. | |
| 7,277,562 B2 | 10/2007 | Zyzdryn | |
| 7,278,581 B2 | 10/2007 | Ong | |
| 7,314,164 B2 | 1/2008 | Bonalle et al. | |
| 7,341,181 B2 | 3/2008 | Bonalle et al. | |
| 7,438,234 B2 | 10/2008 | Bonalle et al. | |
| 7,445,149 B2 | 11/2008 | Bonalle et al. | |
| 7,451,924 B2 | 11/2008 | Bonalle et al. | |
| 7,451,925 B2 | 11/2008 | Bonalle et al. | |
| 7,500,616 B2 | 3/2009 | Beenau et al. | |
| 7,533,828 B2 | 5/2009 | Ong | |
| 7,543,156 B2 | 6/2009 | Campisi | |
| 7,604,176 B2 | 10/2009 | Bates et al. | |
| 7,637,434 B2 | 12/2009 | Beenau et al. | |
| 7,677,459 B2 | 3/2010 | Amouse | |
| 7,690,577 B2 | 4/2010 | Beenau et al. | |
| 7,780,091 B2 | 8/2010 | Beenau et al. | |
| 7,798,415 B1 | 9/2010 | Bates et al. | |
| 7,814,332 B2 | 10/2010 | Beenau et al. | |
| 7,966,263 B2 * | 6/2011 | Beeson | 705/64 |
| 8,066,190 B2 | 11/2011 | Faenza, Jr. | |
| 8,150,772 B2 | 4/2012 | Mardikar et al. | |
| 8,157,181 B2 | 4/2012 | Bates et al. | |
| 8,255,306 B1 | 8/2012 | Thomson | |
| 8,490,872 B2 | 7/2013 | Kim | |
| 2004/0069853 A1 * | 4/2004 | Aharonson | 235/454 |
| 2005/0001711 A1 * | 1/2005 | Doughty et al. | 340/5.74 |
| 2006/0088166 A1 * | 4/2006 | Karusawa | 380/277 |
| 2006/0170530 A1 | 8/2006 | Nwosu et al. | |
| 2006/0213978 A1 | 9/2006 | Geller et al. | |
| 2006/0213979 A1 | 9/2006 | Geller et al. | |
| 2006/0213980 A1 | 9/2006 | Geller et al. | |
| 2006/0224504 A1 | 10/2006 | Nwosu et al. | |
| 2007/0033150 A1 | 2/2007 | Nwosu | |
| 2007/0241183 A1 | 10/2007 | Brown et al. | |
| 2008/0040274 A1 | 2/2008 | Uzo | |
| 2008/0173717 A1 * | 7/2008 | Antebi et al. | 235/439 |
| 2008/0278325 A1 | 11/2008 | Zimman et al. | |
| 2009/0240625 A1 * | 9/2009 | Faith et al. | 705/65 |
| 2009/0248581 A1 | 10/2009 | Brown | |
| 2010/0082444 A1 | 4/2010 | Lin et al. | |
| 2010/0088754 A1 * | 4/2010 | Ghislanzoni | 726/9 |
| 2011/0085732 A1 * | 4/2011 | Cheng | 382/182 |
| 2011/0219427 A1 * | 9/2011 | Hito et al. | 726/3 |
| 2012/0173434 A1 | 7/2012 | Mardikar et al. | |
| 2012/0214442 A1 * | 8/2012 | Crawford et al. | 455/411 |

OTHER PUBLICATIONS

Kasavana, M., "Biometric scanning offers vending new payment options", 3 pages. http://www.allbusiness.com/sales/4079585-1.html.

Kuip, A. et al.,Selecting identification technology, 6 pages.

Hunter, D., "Fingerprint recognition, the future of credit cards, is coming", CNET Asia Blogs, 5 pages. http://asia.cnet.com/blogs/fingerprint-recognition-the-future-of-credit-cards-is-coming-6211....

"IC Card V.S. RFID", EMBA reports (2006). http://joung.im.ntu.edu.tw/teaching/EMBADIS/2006EMBA/reports?IT1_IC-RFID.ppt.

Fazzalaro, J., "The Real ID Act, Enhanced Drivers' Licenses, and Related Applications", OLR Research Report, Nov. 16, 2007, 10 pages. http://www.cga.ct.gov/2007/rpt/2007-R-0659.htm.

Kerala,T., "Biometric Card Key", Biometric Class Reader, Indiamart, http://www.indiamart.com/company/2767972/ products.html, Printed Apr. 17, 2011, 20 pages.

Kasavana, M., "Biometric scanning offers vending new payment options", http://www.allbusiness.com/ sales/4079585-1.html, Apr. 1, 2006, 3 pages.

Hunter, D., "Fingerprint recognition, the future of credit cards, is coming", CNET Asia Blogs, http://asia.cnet.com/blogs/fingerprint-recognition-the-future-of-credit-cards-is-coming-6211, Mar. 28, 2009, 5 pages.

Kuip, a. et al.,"Selecting identification technology", Created Sep. 22, 2008, 6 pages.

Le, Thien Minh, USPTO ExParte Quayle Office Action, U.S. Appl. No. 13/160,664, Mail Date Nov. 19, 2012, 11 pages.

Le, Thien Minh, USPTO Notice of Allowance and Fee(s) Due, U.S. Appl. No. 13/160,664, Date Mailed Mar. 19, 2013, 19 pages.

Le, Thien Minh, USPTO Office Action, U.S. Appl. No. 13/947,772, Notification Date Nov. 17, 2014, 16 pages.

Le, Thien Minh, USPTO Notice of Allowance and Fee(s) Due, U.S. Appl. No. 13/947,722, Date Mailed Mar. 17, 2015, 7 pages.

* cited by examiner

AUTOMATED CARD INFORMATION EXCHANGE PURSUANT TO A COMMERCIAL TRANSACTION

FIELD OF THE INVENTION

In general, the present invention relates to transaction processing. Specifically, the present invention relates to a multi-function smart card and method for automated information exchange pursuant to a commercial transaction.

BACKGROUND OF THE INVENTION

Current identification cards typically use static information for online uses. Such static information is generally easy to hack and/or intercept. Additional instruments/hardware for user identification can increase costs and/or may be unrealistic to use due to the volume of potential users/customers and the number of cards processed at any given point of sale.

U.S. Pat. Nos. 7,533,828 and 7,278,581 disclose an electronic credit card device which includes a keypad, display, speaker, infrared (IR) data input/output (I/O), and radio frequency components.

U.S. Pat. No. 7,205,473 discloses a smart card with an integrated flexible photovoltaic cell or a display module.

U.S. Pat. No. 6,641,050 discloses a smart card that incorporates an electronic fuse and random number generator to improve user authentication security functions during financial transactions.

U.S. Pat. No. 6,325,285 discloses a smart card with an integrated fingerprint reader surface.

U.S. Pat. No. 6,050,494 discloses a smart card with an integrated circuit board, a LCD device, a solar cell unit, and an IC which is connected to all electrical components of the smart card.

U.S. Pat. No. 4,954,985 discloses a data storage card with an integrated liquid crystal display and a data storage region.

U.S. Pat. No. 4,916,296 discloses a smart card which utilizes "light modulated by a spatial light modulating device" to transmit stored data.

U.S. Pat. No. 4,758,718 discloses a secure IC card.

U.S. Patent Application 20090248581 discloses a payment card that includes a "display to support card-not-present transactions where no card reader is available to automate the transaction".

U.S. Patent Application 20070241183 discloses a similar "user display for card-not-present transactions" as 20090248581 but the displayed code is a personal identification number (PIN) rather than a unique account number.

U.S. Pat. No. 7,814,332 discloses a biometrics payment device that primarily deals with voiceprint biometric data.

U.S. Pat. Nos. 7,780,091, 7,690,577, and 7,637,434 disclose a method for registering biometric information for use in an RFID transponder-reader system.

U.S. Pat. Nos. 7,677,459 and 6,997,381 disclose a smart card reader with dual card insertion points.

U.S. Pat. No. 7,543,156 discloses a transaction authentication card which uses biometric input and a wireless output.

U.S. Pat. No. 7,500,616 discloses a system and methods for biometric security using multiple biometrics in a system.

U.S. Pat. Nos. 7,451,925, 7,451,924, 7,445,149, 7,438,234 and 7,314,164 disclose a system and methods for biometric security.

U.S. Pat. No. 7,341,181 discloses a method for biometric security using a smartcard.

U.S. Pat. No. 7,277,562 discloses a biometric imaging capture system and method.

U.S. Pat. No. 7,172,115 discloses a biometric identification system that includes one or more identification devices or cards.

U.S. Pat. No. 6,662,166 discloses a method and device for token-less authorization of an electronic payment.

U.S. Patent Application 20100082444 discloses a portable point of purchase user interface that can include near field communication devices, camera, scanner, and a biometric sensor for acquiring the identification or payment information.

U.S. Patent Application 20080278325 discloses a programmable RFID transponder for transmitting unique identifier data stored in the RFID transponder.

U.S. Patent Application 20080040274 discloses a method for making secure electronic payments using communications devices and biometric data.

U.S. Patent Application 20070033150 discloses a biometric web payment system.

U.S. Patent Application 20060224504 discloses a mobile biometric merchant transaction device.

U.S. Patent Application 20060170530 discloses a fingerprint-based authentication method.

SUMMARY OF THE INVENTION

In general, embodiments of the present invention relate to a card and associated methods for automated information (static and dynamic) exchange pursuant to a commercial transaction. In a typical embodiment, the card (e.g., a credit card, a debit card and/or a smart card) comprises an energy component for providing power to the card and a back display (e.g., positioned on the back or magnetic strip side of the card) for displaying card information being used in the commercial transaction. Upon display, a terminal (e.g., a point of sale terminal) will scan/read the card information and generate a corresponding source validation code (SVC). An imager/image array positioned on the back of the card will scan/read the SVC, and card validation code (CVC) logic on the card will generate a CVC based on the SVC (e.g., based on a validation result of the SVC). A biometric reader positioned on a front side of the card will take a biometric reading (e.g., a fingerprint) from a user of the card, and corresponding user validation code (UVC) logic will generate a UVC based on the biometric reading. The underlying commercial transaction can then be validated (e.g., by a server associated with the terminal or by validation logic on the card itself), and a validation result can be displayed on a front display (e.g., positioned on the front side of the card).

A first aspect of the present invention provides a method for automated card information exchange pursuant to a commercial transaction, comprising: displaying card information on a display positioned on a card being used in the commercial transaction; transmitting the card information to a terminal associated with the commercial transaction; receiving a source verification code (SVC) via an imager positioned on the card, the SVC being generated based on the card information; generating a card validation code (CVC) on the card using the SVC; generating a user validation code (UVC) pertaining to a validation a of user, the UVC code being generated based on a biometric reading taken via a biometric reader positioned on the card; and validating the commercial transaction based on the SVC, the CVC, and the UVC.

A second aspect of the present invention provides a card for automated card information exchange pursuant to a commercial transaction, comprising: an energy component for providing power to the card; a first display for displaying card information being used in the commercial transaction; an imager for receiving a source verification code (SVC) from a terminal associated with the commercial transaction, the SVC being generated based on the card information; card validation code (CVC) logic for generating a CVC based on SVC; a biometric reader for taking a biometric reading from a user of the card; and user validation code (UVC) logic for generating a UVC based on the biometric reading.

A third aspect of the present invention provides a card for automated card information exchange pursuant to a commercial transaction, comprising: a first display for displaying card information being used in the commercial transaction to a terminal associated with the commercial transaction; an imager for receiving a source verification code (SVC) from a terminal associated with the commercial transaction, the SVC being generated based on the card information; card validation code (CVC) logic for generating a CVC based on SVC; a biometric reader for taking a biometric reading from a user of the card; user validation code (UVC) logic for generating a UVC based on the biometric reading; validation logic for generating a validation result based on the SVC, the CVC, and the UVC; and a second display for displaying the validation result.

BRIEF DESCRIPTION OF THE DRAWINGS

These and other features of this invention will be more readily understood from the following detailed description of the various aspects of the invention taken in conjunction with the accompanying drawings in which.

Figure 1:
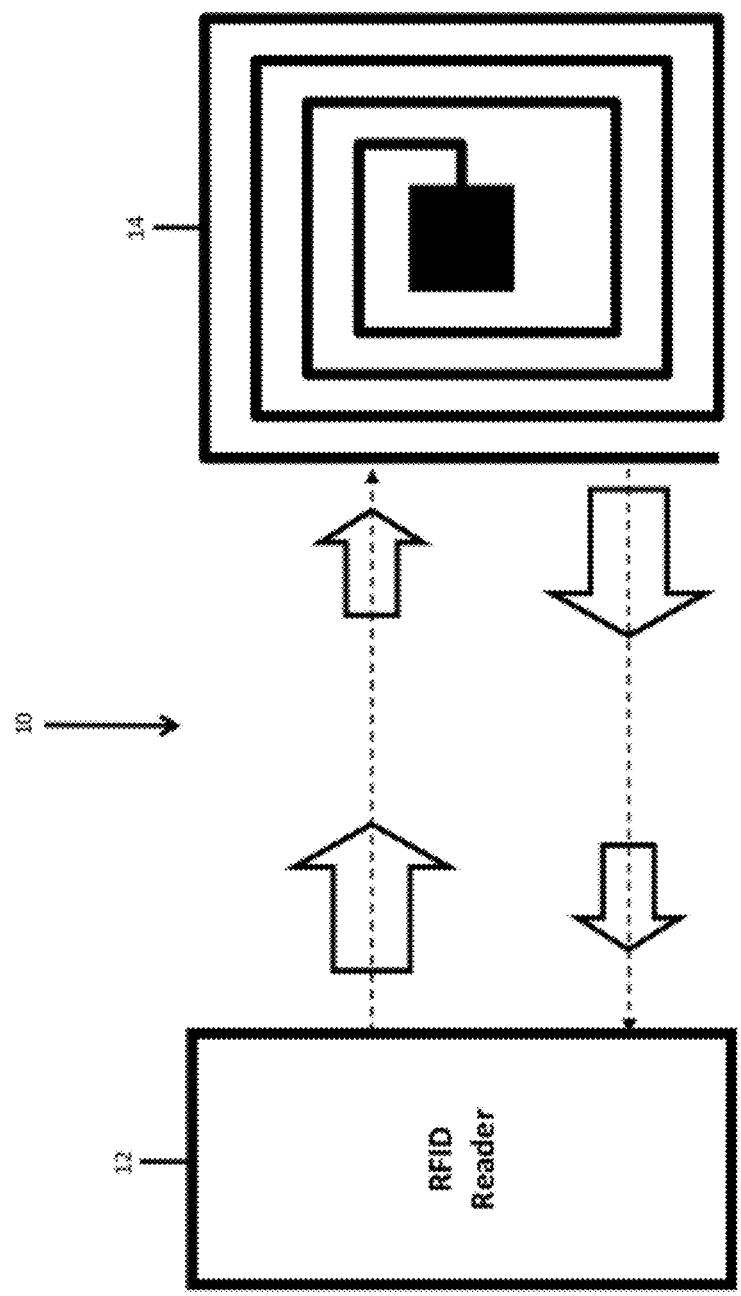
FIG. 1 depicts an RFID configuration according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention relate to a card and associated methods for automated information (static and dynamic) exchange pursuant to a commercial transaction. In a typical embodiment, the card (e.g., a credit card, a debit card and/or a smart card) comprises an energy component for providing power to the card and a back display (e.g., positioned on the back or magnetic strip side of the card) for displaying card information being used in the commercial transaction. Upon display, a terminal (e.g., a point of sale terminal) will scan/read the card information and generate a corresponding source validation code (SVC). An imager/image array positioned on the back of the card will scan/read the SVC, and card validation code (CVC) logic on the card will generate a CVC based on the SVC (e.g., based on a validation result of the SVC). A biometric reader positioned on a front side of the card will take a biometric reading (e.g., a fingerprint) from a user of the card, and corresponding user validation code (UVC) logic will generate a UVC based on the biometric reading. The underlying commercial transaction can then be validated (e.g., by a server associated with the terminal or by validation logic on the card itself), and a validation result can be displayed on a front display (e.g., positioned on the front side of the card).

It is understood that the term "card" as use herein is intended to mean any type of card now known or later developed that can be used pursuant to a commercial transaction. Along these lines, radio-frequency identification (RFID) technology could be implemented (e.g., in a smart card embodiment). As such, this disclosure includes a description of RFID.

In general, RFID is a technology that incorporates the use of electromagnetic or electrostatic coupling in the radio frequency (RF) portion of the electromagnetic spectrum to uniquely identify an object, animal, or person. RFID is coming into increasing use in the industry as an alternative to the bar code. The advantage of RFID is that it does not require direct contact or line-of-sight scanning. An RFID system consists of three components: an antenna and transceiver (often combined into one reader) and a transponder (the tag). The antenna uses radio frequency waves to transmit a signal that activates the transponder. When activated, the tag transmits data back to the antenna. The data is used to notify a programmable logic controller that an action should occur. The action could be as simple as raising an access gate or as complicated as interfacing with a database to carry out a monetary transaction. Low-frequency RFID systems (e.g., 30 KHz to 500 KHz) have short transmission ranges (generally less than six feet). High-frequency RFID systems (850 MHz to 950 MHz and 2.4 GHz to 2.5 GHz) offer longer transmission ranges (more than 90 feet). RFID is sometimes called dedicated short range communication (DSRC).

RFID tags and labels (collectively referred to herein as "devices" or transponders) are widely used to associate an object with an identification code or other information. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels. As noted above, RFID devices are generally categorized as labels or tags. RFID labels are RFID devices that are adhesive or otherwise have a surface attached directly to objects. RFID tags, in contrast, are secured to objects by other means (for example, by use of a plastic fastener, string, or other fastening means).

RFID devices include: (1) active tags and labels, which include a power source for broadcasting signals; and (2) passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and communicate enough information to uniquely identify individuals, packages, inventory, and the like. RFID tags and labels also can be characterized as those to which information is written only once (although the information may be read repeatedly), and those to which information may be written to repeatedly during use. For example, RFID tags may store environmental data (that may be detected by an associated sensor), logistical histories, state data, etc.

Along these lines, RFID devices can be further characterized as passive, semi-passive, and active RFID devices. Passive RFID devices have no internal power supply. Power for operation of passive RFID devices is provided by the energy in an incoming radio frequency signal received by the device. Most passive RFID devices signal by backscattering the carrier wave from an RF reader. Passive RFID devices have the advantage of simplicity and long life, although performance of them may be limited. In general, the teachings recited herein pertain to passive RFID technology Referring now to FIG. 1, an illustrative RFID configuration according to the present invention is shown. As depicted, configuration 10 shows an RFID transceiver/reader 12 communicating with RFID transponder 14. Transponder 14 can be any type of RFID transponder now known or later developed. Examples include the aforementioned labels and/or tags. As further shown, RFID reader 12 and RFID transponder 14 will exchange data (e.g., security information, etc.). Under the present invention, these types of components will be leveraged to create a strong passive ad-hoc RFID network that is (among other things) capable of communicating over longer distances and around physical objects.

Figure 2A:
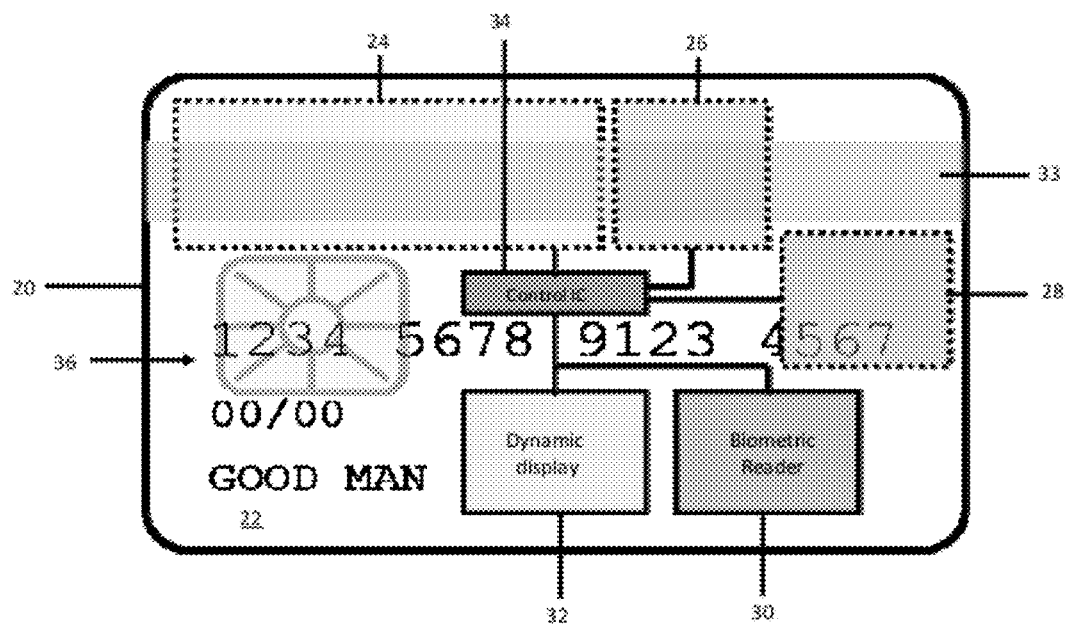
FIGS. 2A-B depicts a front and back of a multi-function card according to an embodiment of the present invention.
Figure 2B:
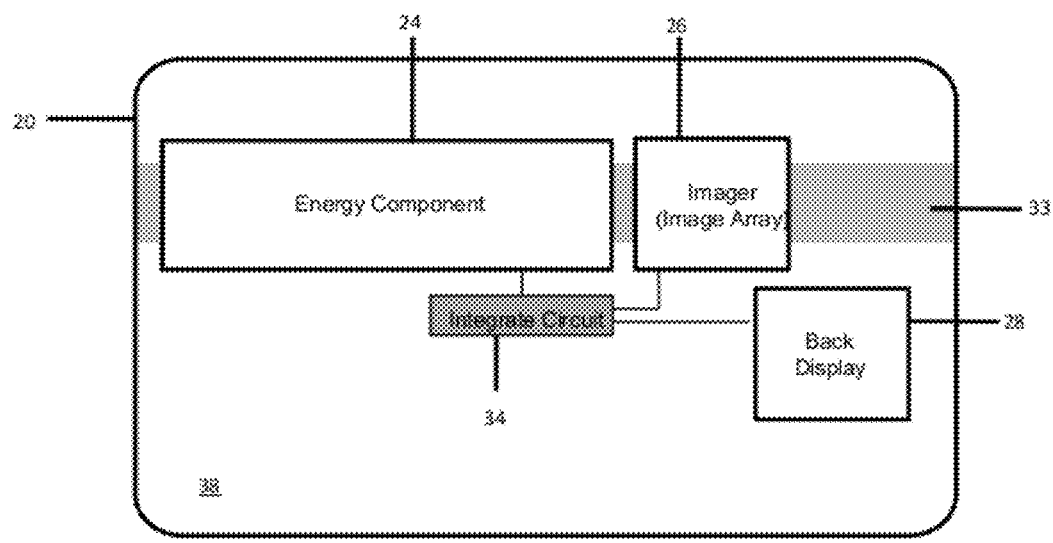

Referring now to FIGS. 2A-B, a card (e.g., a credit card, a debit card and/or a smart card) 20 according to an embodiment of the present invention is shown. Card 20 can be equipped to communicate in an RFID manner using any of the aforementioned description. In any event, as shown, card 20 includes a front side 22 and a back or magnetic stripe side 38. As depicted in FIG. 2A, front side 22 includes card information 36, a dynamic display 32 and a biometric reader 30. As shown in FIG. 2B, back side 38 of card 20 includes an energy component 24 (e.g., a solar panel cell and/or a photon-to-electric energy converter) for providing power to card 20, an imager/image array 26, and magnetic strip 33. As further shown, embedded within the card, is integrated circuit/controller 34 and corresponding logic. The functions and interrelationships between the components of FIGS. 2A-B will be described in conjunction with FIG. 3.

Figure 3:
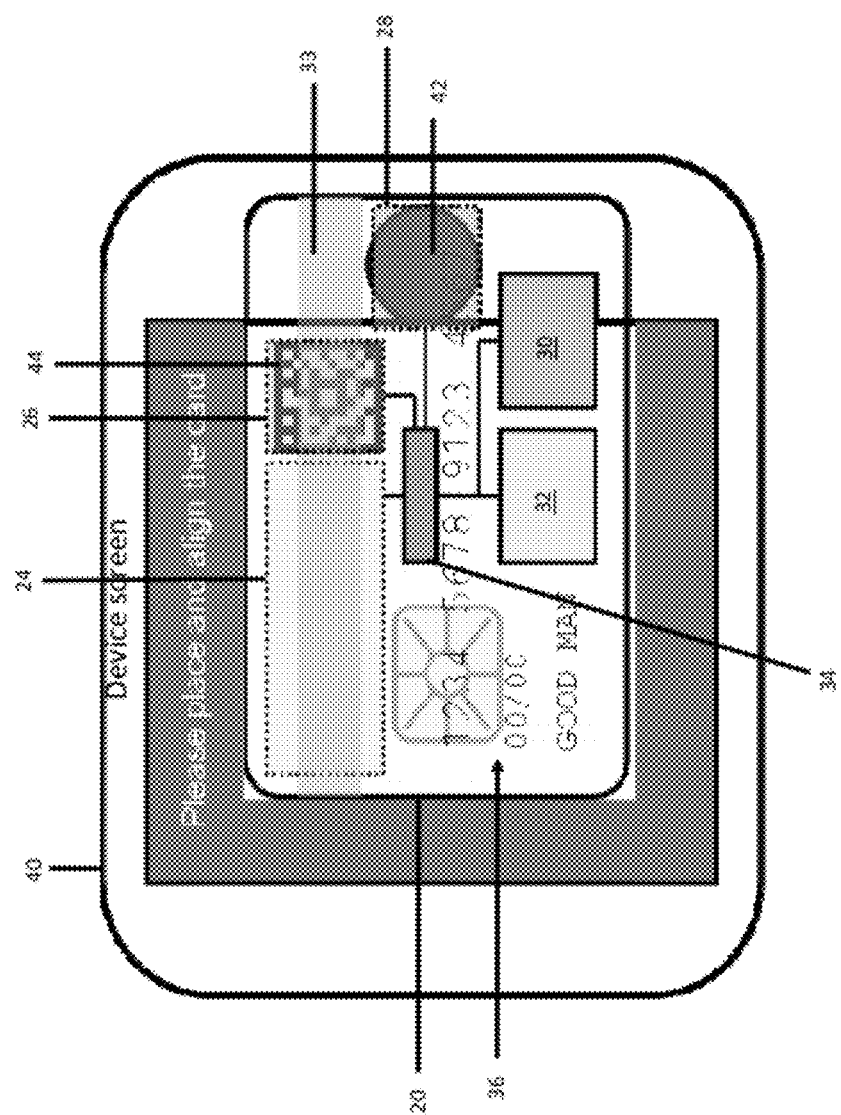
FIG. 3 depicts the card of FIG. 2 as used pursuant to a commercial transaction according to an embodiment of the present invention.

As shown in FIG. 3, when a commercial transaction is being conducted, card 20 will be placed in proximity and/or alignment with a point of sale terminal 40 or the like (or a display associated therewith), and powered-up/activated via energy component 24. Card information 36 (e.g., the card number, expiration, user name, security code, etc.) will then be displayed on back display 28, and read by information reader 42 of terminal 40. Either terminal 40 or a server associated therewith will then generate a source verification code (SVC) 44 based on the card information and/or historical purchase data associated with card 20. SVC 44 (e.g., a 2-D code or 2-D varying with motion) will be displayed on terminal 40 and can be scanned/read by imager 26 on back of card 20. Once read by card 20, card validation code (CVC) logic within the card (e.g., as implemented via integrated circuit 34) will generate a CVC on the card using the SVC. Specifically, the CVC logic will attempt to validate the SVC, and then generate a CVC based on the validation result. Thereafter, biometric reader 30 will be used to capture a biometric reading (e.g., a fingerprint) associated with a user of card 20. Based on the biometric reading user validation code (UVC) logic will generate a UVC confirming whether the user is the owner of card 20. This can occur by comparing the biometric reading to one saved locally on the card. Thereafter, the commercial transaction will be validated based on the SVC, the CVC, and the UVC. Such validation can occur using validation logic also stored on card 20, and/or via a server associated with terminal 40. In either event, a corresponding validation result can be displayed on front display 32 of card 20.

Figure 4:
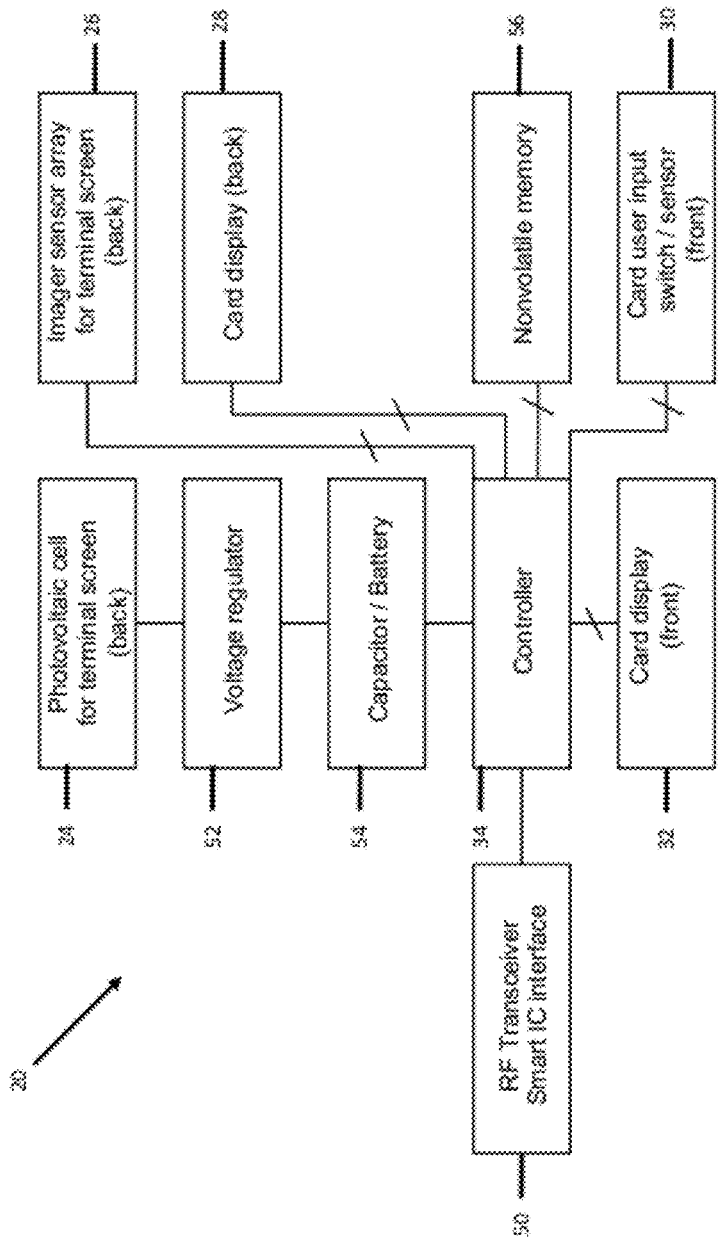
FIG. 4 depicts a block diagram of the card of FIG. 2 according to an embodiment of the present invention.

Referring now to FIG. 4, a block diagram of card 20 is shown. As depicted, energy component 24, imager 26, back display 28, biometric reader 30, front display 32, and controller/integrate circuit 34 are coupled via one or more other components. Such components can include a voltage regulator 52, a capacitor and/or battery 54, and memory 56 (e.g., non-volatile) for storing the aforementioned logic (e.g., CVC logic, UVC logic, validation logic, etc.), which is implemented by controller 34. As further shown, the card can include an RFID component 50 for communicating with the terminal of FIG. 3 via RFID means.

FIGS. 5-9 depict various method/process flow diagrams according to the present invention. It is understood that these methods/processes will be implemented and/or carried out using the teachings recited in conjunction with FIGS. 1-4.

Figure 5:
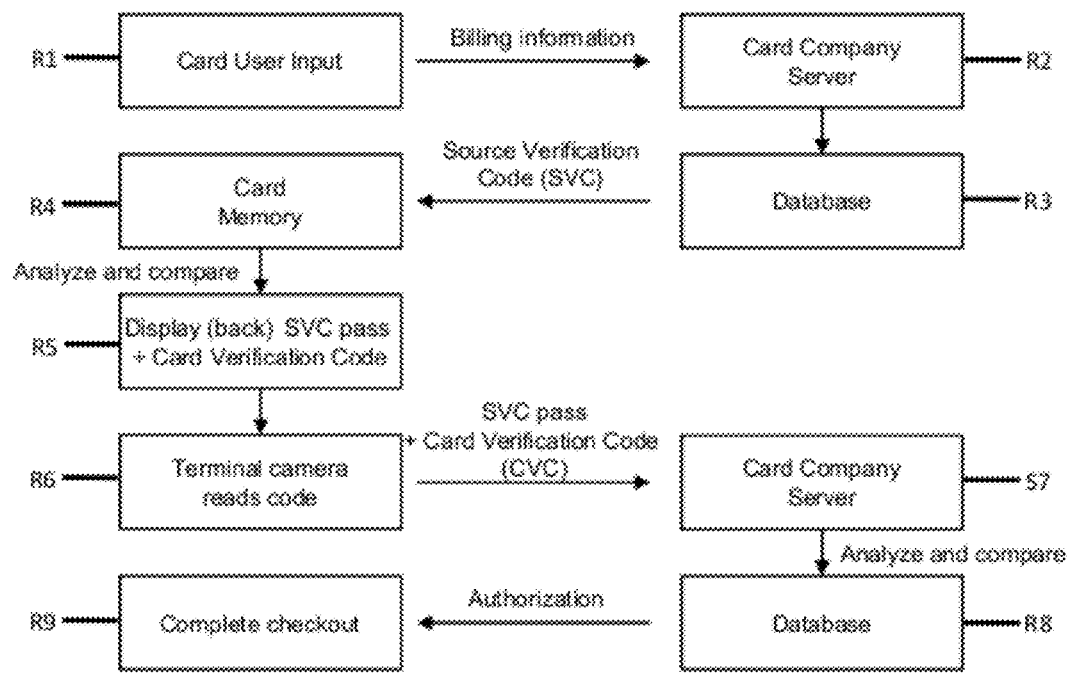
FIG. 5 depicts a method flow diagram according to the embodiment of the present invention.

Referring first to FIG. 5, a method for validation based on an SVC and CVC is shown. In step R1, card user input (e.g., billing information) is sent to a card company server (via the back display) where it is received in step R2. In step R3, the information is cross-referenced against a database, and a SVC is generated and sent back to the card (via the imager) where the SVC is received, analyzed and compared to card memory in step R4. In step R5, a CVC is generated based on a validation of the SVC. In step R6, the code(s) are passed via the back display to the terminal (e.g., via a terminal camera and/or scanner), and passed to a credit card company server in step R7. In step R8, the codes are validated against a database, and if successful, the transaction/checkout is completed in step R9.

Figure 6:
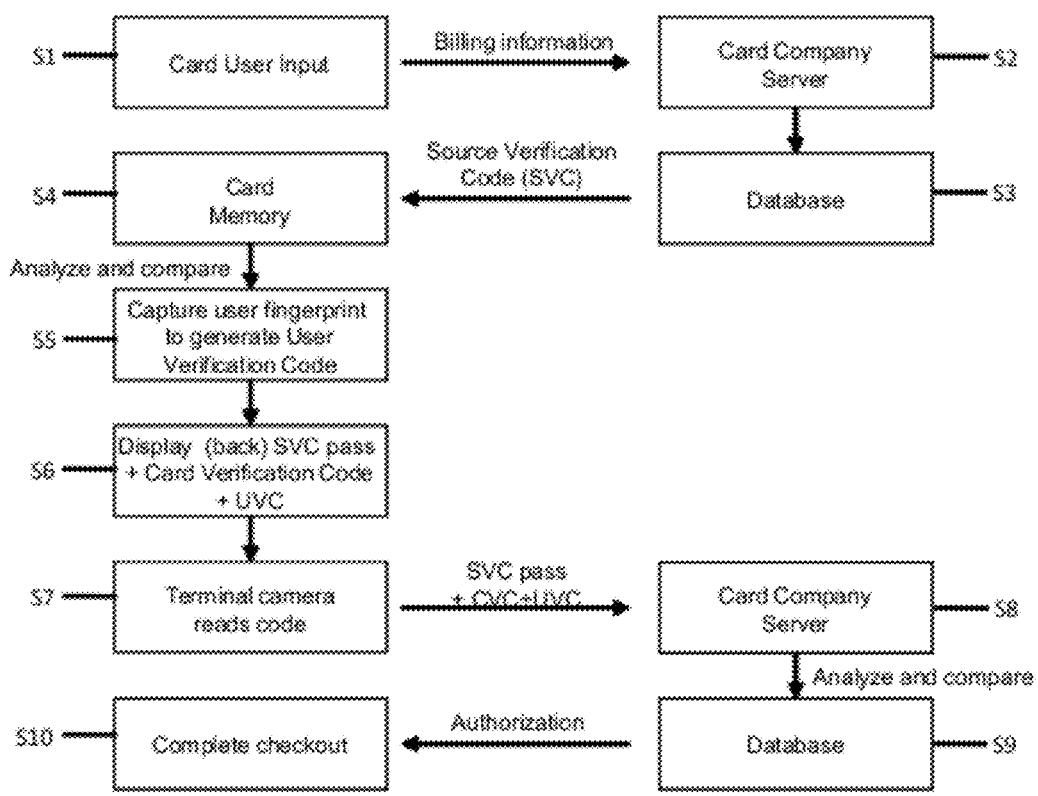
FIG. 6 depicts another method flow diagram according to the embodiment of the present invention.

Referring now to FIG. 6, a method flow diagram for validating a transaction based on a SCS, CVC, and UVC according to an embodiment of the present invention is shown. In step S1, card user input (e.g., billing information) is sent to a card company server (via the back display) where it is received in step S2. In step S3, the information is cross-referenced against a database, and a SVC is generated and sent back to the card (via the imager) where the SVC is received, analyzed and compared to card memory in step S4. In step S5, a fingerprint is captured and used to generate a UVC. In step S6, a CVC is generated based on a validation of the SVC. In step S7, the code(s) are passed via the back display to the terminal (e.g., via a terminal camera and/or scanner), and passed to a credit card company in step S8. In step S9, the codes are validated against a database, and if successful, the transaction/checkout is completed in step S10.

Figure 7:
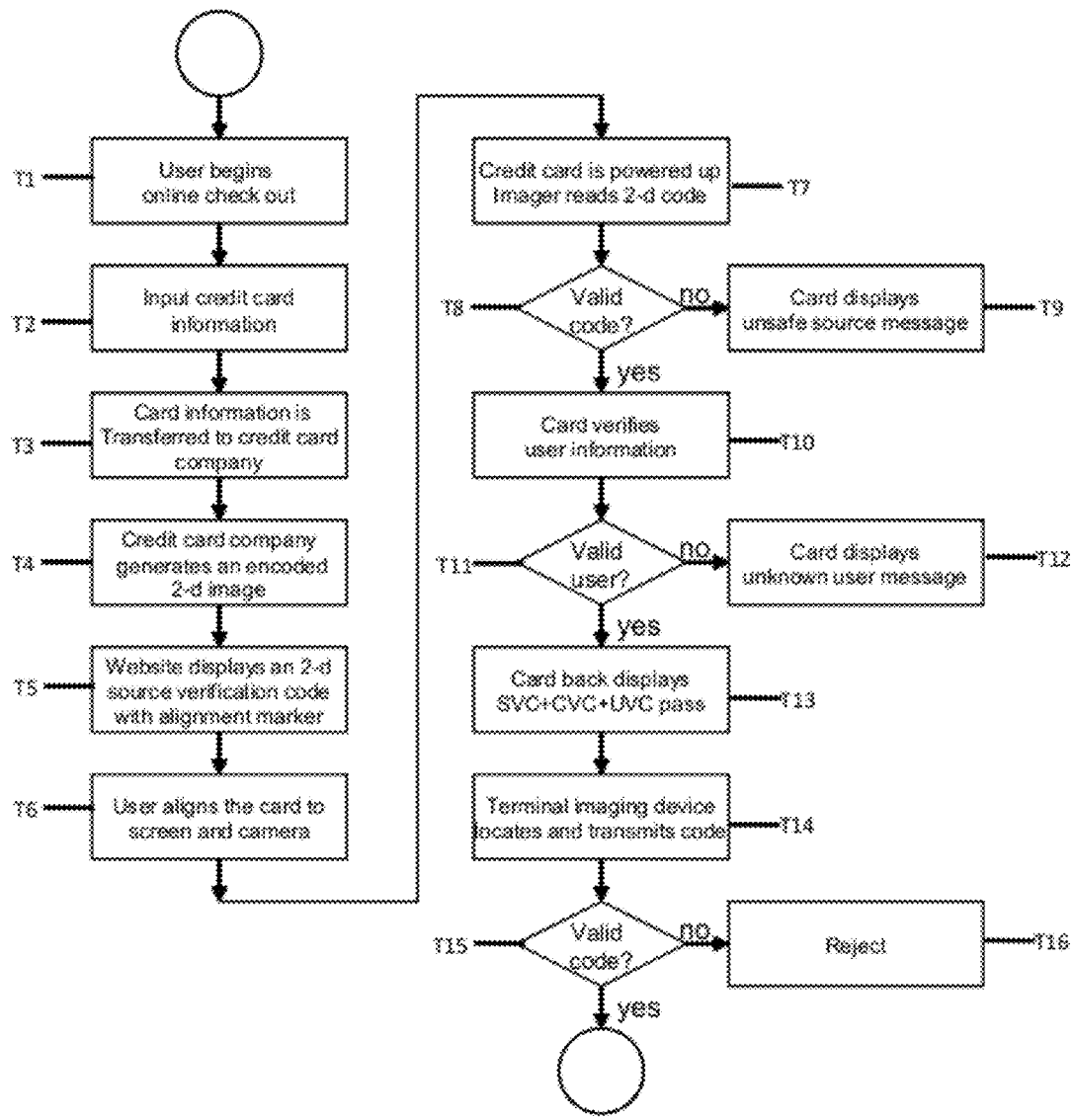
FIG. 7 depicts another method flow diagram according to the embodiment of the present invention.

Referring now to FIG. 7, a method flow diagram for card-based validation/verification of a transaction according to an embodiment of the present invention is shown. In step T1, a user begins online checkout pursuant to a commercial transaction. In step T2, card user information (e.g., billing information) is input. In step T3, the card information is sent to a card company server. In step T4, the credit card company will generate the SVC as a 2-D encoded image. In step T5, the website will display the SVC with an alignment marker. In step T6, the user will align the image on the back of the card to the screen. In step T7, the card is powered-up/activated (via the energy component on the back of the card). In step T8, the SVC is read (e.g., via the image on the back of the card) and it is determined whether the SVC is valid. If not, the card displays an unsafe source message (e.g., via the front display) in step T9. However, if the code was valid, the card will verify the user's information in step T10 (e.g., validate the UVC generated pursuant to a fingerprint scan). In step T11, it is determined whether the user was valid. If not, the card displays an unknown user message in step T12. If the user is valid, the card displays the SVC, CVC, and UVC codes in step T13. Then, in step T14, the terminal imaging device locates and transmits the code(s). In step T15, the card determines whether the codes are valid. If not, the transaction is rejected in step T16. If the codes are valid, the transaction is approved.

Figure 8:
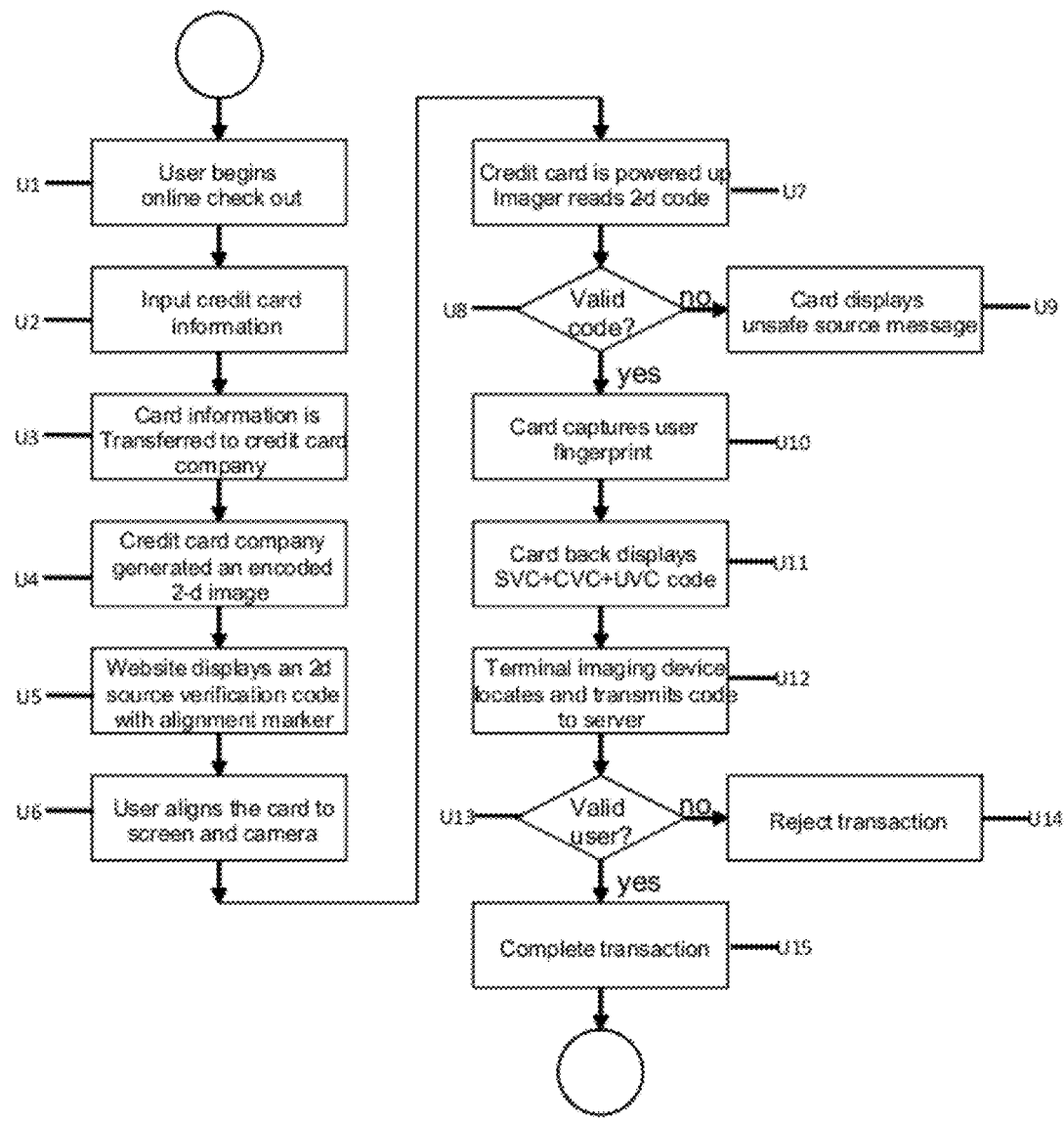
FIG. 8 depicts another method flow diagram according to the embodiment of the present invention.

Referring now to FIG. 8, a method flow diagram for server-based validation/verification of a transaction according to an embodiment of the present invention is shown. In step U1, a user begins online checkout pursuant to a commercial transaction. In step U2, card user information (e.g., billing information) is input. In step U3, the card information is sent to a card company server. In step U4, the credit card company will generate the SVC as a 2-D encoded image. In step U5, the website will display the SVC with an alignment marker. In step U6, the user will align the image on the back of the card to the screen. In step U7, the card is powered-up/activated (via the energy component on the back of the card). In step U8, the SVC is read (e.g., via the image on the back of the card) and it is determined whether the SVC is valid. If not, the card displays an unsafe source message (e.g., via the front display) in step U9. However, if the code was valid, the card will verify the user's information in step U10 (e.g., validate the UVC generated pursuant to a fingerprint scan). In step U11, the SVC, CVC, and UVC are displayed on the card (via the back display). In step U12, the terminal locates the code(s) and transmits the same to an associated server. IN step U13, it is determined by the server whether the user was valid. If not, the transaction is rejected in step U14. If the code(s) are valid, the transaction is validated and approved in Step U15.

Figure 9:
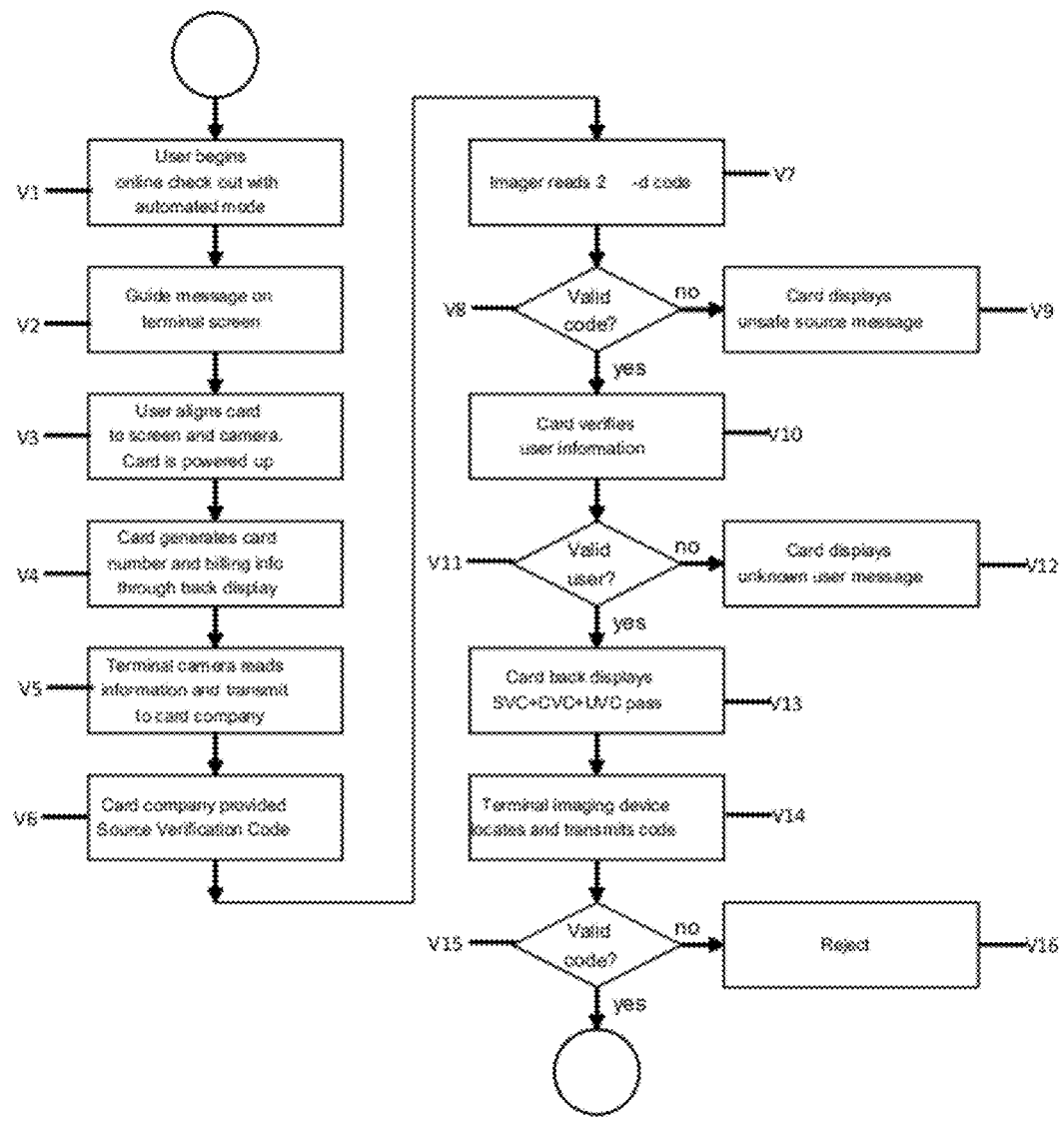
FIG. 9 depicts another method flow diagram according to the embodiment of the present invention.

Referring now to FIG. 9, a method flow diagram for automatic information exchange according to an embodiment of the present invention is shown. In step V1, a user begins online checkout pursuant to a commercial transaction with an automated mode. In step V2, a guide message is displayed on a terminal screen. In step V3, the user aligns the card with the screen and the card is powered-up/activated. In step V4, the card generates card information (e.g., card number and/or billing information) and displays the same on the back display. In step V5, the terminal camera reads the card information and transmits the same to the card company. In step V6, the card company generates and provides the SVC, which is displayed on the terminal's screen. In step V7, the imager on the back of the card reads the SVC code. In step V8, the SVC logic in the card memory validates the SVC. In step V9, if the SVC is invalid, an "unsafe source" message is displayed (e.g., on the front display). In step V10, the card receives and attempts to verify user information taken with the biometric reader on the front of the card. IN step V11, it is determined whether the user is valid. If not, the front display will display an "unknown user" message in step V12. If the user was validated, the card's back display will display the SVC, UVC, and CVC (generated based on a validation result of the SVC) in step V13. This information can be located and read by the terminal, which will transmit the same to an associated server in step V14. In step V15, it is determined whether the code(s) were valid. If not, the transaction is rejected in step V16. If the code(s) are valid, the transaction is validated and approved in V17.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for automated card information exchange pursuant to a commercial transaction, comprising:
    powering a card being used in the commercial transaction by a photon-to-electric energy converter;
    displaying card information on a dynamic visual display positioned on the card;
    transmitting, via a radio frequency identification (RFID) component, the card information to a terminal associated with the commercial transaction using the dynamic visual display;
    receiving, from a website, a source verification code (SVC) with an alignment marker via an imager positioned on the card, the SVC being an encoded 2-dimensional image generated based on the card information;
    aligning the card with a screen of the terminal according to the alignment marker;
    generating a card validation code (CVC) on the card using the SVC;
    generating a user validation code (UVC) pertaining to a validation a of user, the UVC code being generated based on a biometric reading taken via a biometric reader positioned on the card; and
    validating the commercial transaction based on the SVC, the CVC, and the UVC.

2. The method of claim 1, further comprising:
    aligning the card with the terminal pursuant to the commercial transaction; and
    activating power on the card in response to the aligning, prior to the displaying.

3. The method of claim 1, the card information comprising a card number and billing information associated with the card.

4. The method of claim 1, the SVC being generated based upon historical transactional data associated with the card.

5. The method of claim 1, the card being at least one of the following: a credit card, a debit card, or a smart card.

6. The method of claim 1, the validating comprising generating a validation result on the card.

7. The method of claim 1, the validating occurring on a server associated with the terminal.

8. A card for automated card information exchange pursuant to a commercial transaction, comprising:
- an energy component for providing power to the card, the energy component comprising a photon-to-electric energy converter;
- a first dynamic visual display for displaying card information being used in the commercial transaction;
- an imager for receiving a source verification code (SVC) from a terminal associated with the commercial transaction, the SVC being a 2-dimensional code which varies with motion generated based on the card information;
- a radio-frequency identification device (RFID) component for communicating with the terminal;
- an integrated circuit comprising card validation code (CVC) logic for generating a CVC based on the SVC;
- a biometric reader for taking a biometric reading from a user of the card; and
- user validation code (UVC) logic for generating a UVC based on the biometric reading.

9. The card of claim 8, further comprising validation logic for generating a validation result based on the SVC, the CVC, and the UVC.

10. The card of claim 8, further comprising a second display for displaying the validation result, and wherein the first display is configured to display the SVC, the CVC, and the UVC in response to the generation of the validation result by the validation logic.

11. The card of claim 9, CVC logic, the UVC logic, and the validation logic being enabled by an integrated circuit.

12. The card of claim 8, the energy component comprising a solar panel cell.

13. The card of claim 8, the energy component comprising a photon-to-electric energy converter.

14. The card of claim 8, the SVC being generated based upon historical transactional data associated with the card and the card information displayed via the first display.

15. The card of claim 8, the card being at least one of the following: a credit card, a debit card, or a smart card.

16. A card for automated card information exchange pursuant to a commercial transaction, comprising:
- an energy component comprising a photon-to-electric energy converter for powering a card being used in the commercial transaction;
- a first dynamic visual display for displaying card information being used in the commercial transaction to a terminal associated with the commercial transaction;
- a radio frequency identification device (RFID) component for communicating with the terminal;
- an imager for receiving a source verification code (SVC) from a terminal associated with the commercial transaction, the SVC being an encoded 2-dimensional image generated based on the card information;
- an integrated circuit comprising card validation code (CVC) logic for generating a CVC based on the SVC;
- a biometric reader for taking a biometric reading from a user of the card;
- user validation code (UVC) logic for generating a UVC based on the biometric reading;
- validation logic for generating a validation result based on the SVC, the CVC, and the UVC; and
- a second display on the card for displaying the validation result where the validation result is viewable on the second display to a user of the card;
- wherein the first display is configured to display the SVC, the CVC, and the UVC in response to the generated validation result by the validation logic.

17. The card of claim 16, further comprising an energy component for providing power to the card.

18. The card of claim 16, CVC logic, the UVC logic, and the validation logic being enabled by an integrated circuit.

19. The card of claim 16, the energy component comprising at least one of a solar panel cell, or a photon-to-electric energy converter.

20. The card of claim 16, the card being at least one of the following: a credit card, a debit card, or a smart card.

* * * * *